United States Patent [19]
Chino et al.

[11] Patent Number: 5,486,742
[45] Date of Patent: Jan. 23, 1996

[54] EASILY STARTED DC MOTOR APPARATUS

[75] Inventors: Hiroyuki Chino; Toshiya Akasaka; Minoru Iwata, all of Kanagawa, Japan

[73] Assignee: Ebara Corporation, Tokyo, Japan

[21] Appl. No.: 183,775

[22] Filed: Jan. 21, 1994

Related U.S. Application Data

[63] Continuation of Ser. No. 940,230, Sep. 3, 1992, abandoned.

[30] Foreign Application Priority Data

Sep. 17, 1991 [JP] Japan ................................... 3-265250

[51] Int. Cl.$^6$ ................................................. H02P 6/02
[52] U.S. Cl. ......................... 318/254; 318/138; 318/439
[58] Field of Search ................................... 318/254, 138, 318/257, 439, 436, 696

[56] References Cited

U.S. PATENT DOCUMENTS

| | | | |
|---|---|---|---|
| 3,609,492 | 9/1971 | Rakes . | |
| 3,831,073 | 8/1974 | Tanikoshi | 318/254 |
| 3,922,590 | 11/1975 | Warren et al. | 318/138 |
| 3,997,823 | 12/1976 | Machida . | |
| 4,027,213 | 5/1977 | de Valroger | 318/138 |
| 4,205,260 | 5/1980 | Maeda et al. | 318/257 |
| 4,251,758 | 2/1981 | Pedersen et al. | 318/254 |
| 4,418,303 | 11/1983 | Abe et al. . | |
| 4,449,079 | 5/1984 | Erdman . | |
| 4,454,458 | 6/1984 | Holland . | |
| 4,492,903 | 1/1985 | Knight et al. | 318/254 |
| 4,642,539 | 2/1987 | Hinds | 318/439 |
| 4,658,192 | 4/1987 | Casteel et al. | 318/809 |
| 4,678,973 | 7/1987 | Elliott et al. | 318/138 |
| 4,706,005 | 11/1987 | Iwaka | 318/254 |
| 4,713,544 | 12/1987 | Bose et al. | 318/696 |
| 4,713,594 | 12/1987 | Bose et al. | 318/685 |
| 4,763,347 | 8/1988 | Erdman . | |
| 4,814,676 | 3/1989 | Van Hout . | |
| 4,959,599 | 9/1990 | Nakadai et al. | 318/480 |
| 4,999,560 | 3/1991 | Morishima et al. . | |
| 5,023,527 | 6/1991 | Erdman et al. . | |
| 5,068,582 | 11/1991 | Scott | 318/138 |
| 5,235,264 | 8/1993 | Kaneda et al. | 318/138 |

FOREIGN PATENT DOCUMENTS

| | | |
|---|---|---|
| 125453/77 | 5/1977 | Australia . |
| 81938/82 | 6/1985 | Australia . |
| 0072597 | 2/1983 | European Pat. Off. . |
| 0316077 | 10/1988 | European Pat. Off. . |
| 60-100822 | 7/1985 | Japan . |
| 61-165051 | 10/1986 | Japan . |
| 62-65116 | 3/1987 | Japan . |
| 62-98410 | 5/1987 | Japan . |
| 2020915 | 11/1979 | United Kingdom . |
| WO89/11523 | 11/1989 | WIPO . |

OTHER PUBLICATIONS

Patent Abstracts of Japan, vol. 11, No. 110, (E–496)[2557], Apr. 7, 1987, & JP–A–61–258696, Nov. 17, 1986, Masaki Takahashi, et al., "Starter of Magnet Rotary Type Motor".
Patent Abstracts of Japan, vol. 11, No. 338, (E–553)[2785], Nov. 5, 1987, & JP–A–62–118785, May 30, 1987, Kanji Izaki, et al., "Starter for Commutatorless Motor".

*Primary Examiner*—John W. Cabeca
*Attorney, Agent, or Firm*—Oblon, Spivak, McClelland, Maier, & Neustadt

[57] ABSTRACT

A DC motor apparatus which can be started with a power supply having a small current capacity and which provides a large driving force. The DC motor apparatus comprises a permanent magnet in a rotor of the DC motor, a plurality of coils provided at a stator of the DC motor, a distributor for controlling the switching of current paths to the coils and a position detector for detecting a rotational position of the rotor of the motor to output switching signal to the distributor. A pulsating unit is further provided for pulsating currents supplied to the coils whereby a current flowing from the distributor to any one of the coils can be pulsated when the DC motor is activated, resulting in easy starting the DC motor.

6 Claims, 8 Drawing Sheets

Fig. 1

PRIOR ART

Fig. 2

PRIOR ART

Fig. 3A (PRIOR ART)

OUTPUT a OF POSITION DETECTOR

Fig. 3B (PRIOR ART)

OUTPUT b OF POSITION DETECTOR

Fig. 3C (PRIOR ART)

COIL 2

Fig. 3D (PRIOR ART)

COIL 3

Fig. 3E (PRIOR ART)

COIL 4

Fig. 3F (PRIOR ART)

COIL 5

EASILY STARTED DC MOTOR APPARATUS

This application is a Continuation of application Ser. No. 07/940,230, filed on Sep. 3, 1992, now abandoned.

BACKGROUND OF THE INVENTION

1. Filed of the Invention

The present invention relates to a DC motor apparatus, and more particularly, to & DC motor which can be started with a small starting current.

2. Prior Art

In a conventional DC motor which requires a large driving force, a magnetic path is formed by a magnetic material section to enhance a magnetic flux density generated by a coil. A magnetic flux from a permanent magnet incorporated in a movable part of a motor converges in such a magnetic material section having high permeability. Therefore, since an intensive magnetic attracting force is generated between the permanent magnet and the magnetic material section it is necessary to supply a large exciting current from a power supply to such a DC motor.

Figure 1:
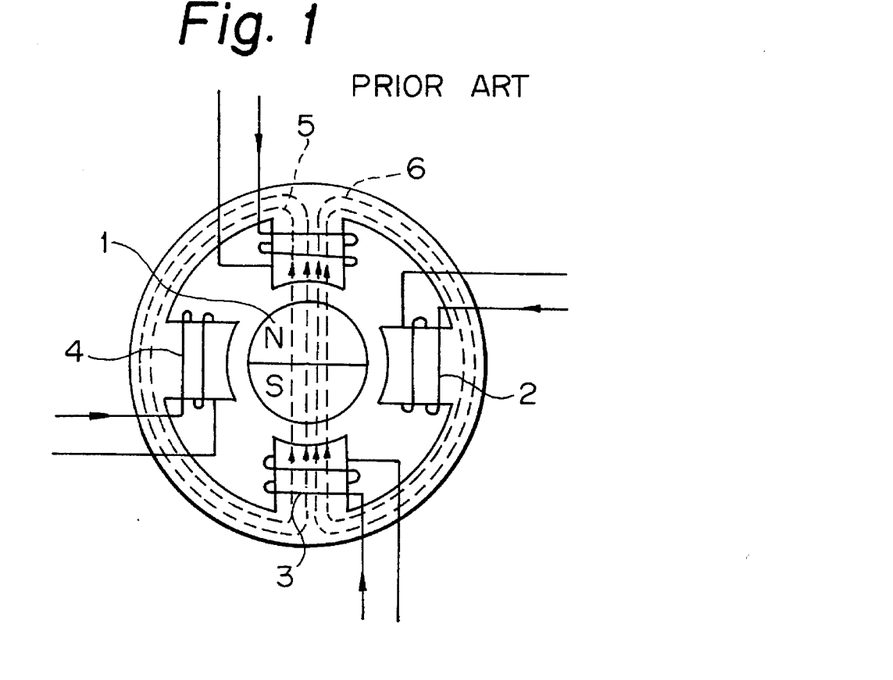
FIG. 1 is a cross-sectional view illustrating magnetic pole pot%ions of a rotor and a stator of an ordinary DC motor.

FIG. 1 is a cross-sectional view indicating magnetic pole portions of a rotor and a stator of an ordinary DC motor. A permanent magnet 1 of the rotor has magnetic poles arranged alternately and coils 2 to 5 of the stator are formed around iron core 8. As explained above, since a magnetic flux generated from permanent magnet 1 converges in iron core 6 consisting of a magnetic material having a high permeability, an intensive magnetic attracting force is generated between iron core 6 and permanent magnet 1 and the rotor is restricted to stay in a constant direction. Therefore, it is necessary to generate a magnetic flux sufficient to overcome such restricting forces generated by other coils (coils 2 and 4 in FIG. 1), in order to rotate the rotor.

Figure 2:
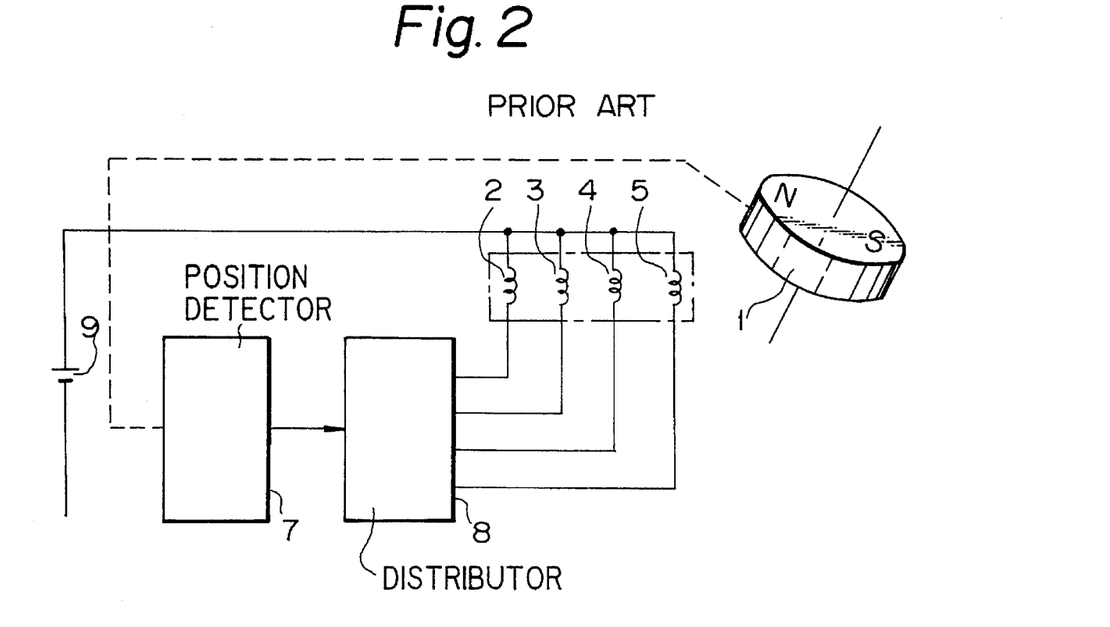
FIG. 2 illustrates an example of an ordinary structure of a conventional DC motor apparatus.
Figure 3A:
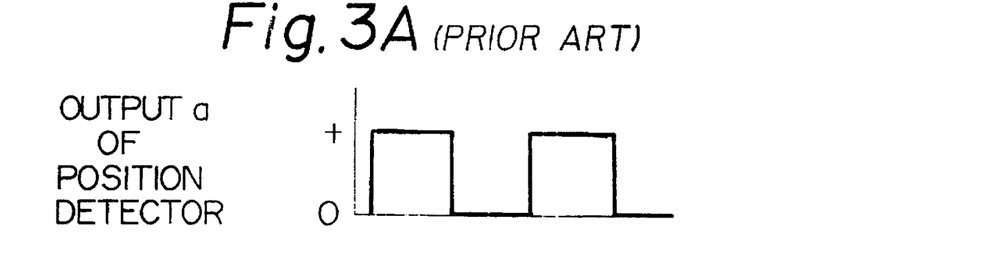
FIG. 3 illustrates waveforms of the output of a position detector and of coil currents after a DC motor apparatus is started.
Figure 3B:
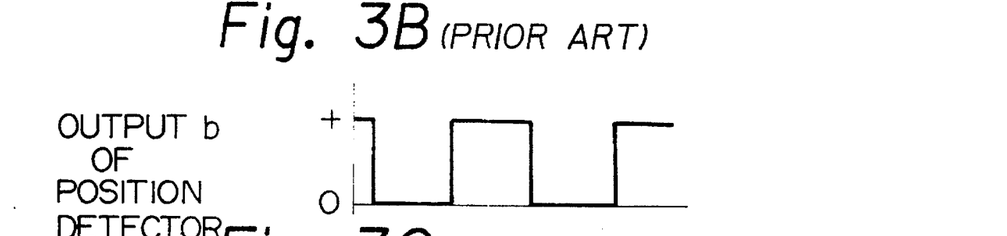
Figure 3C:
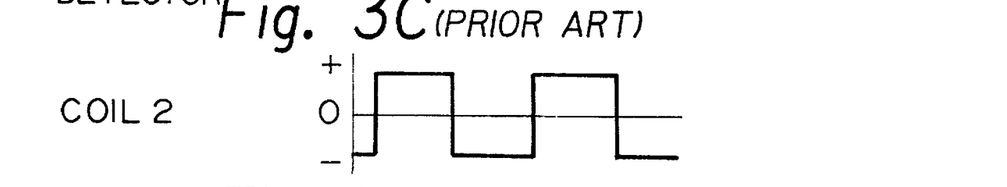
Figure 3D:
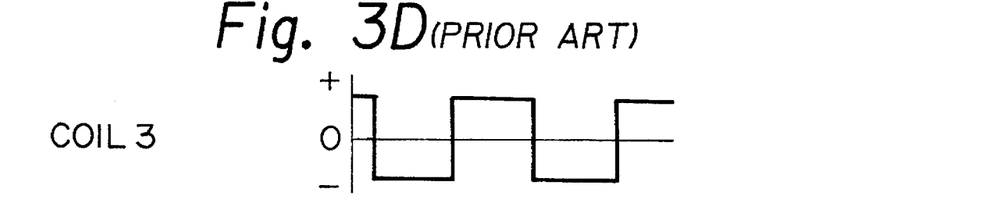
Figure 3E:
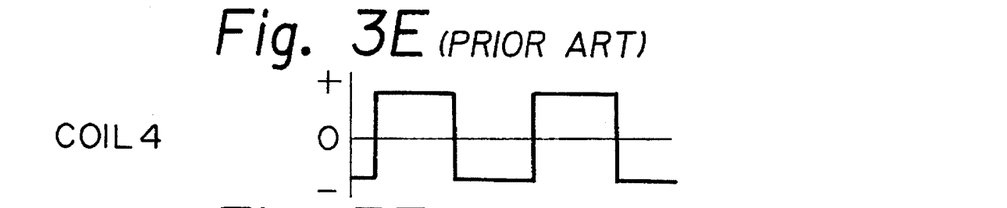
Figure 3F:
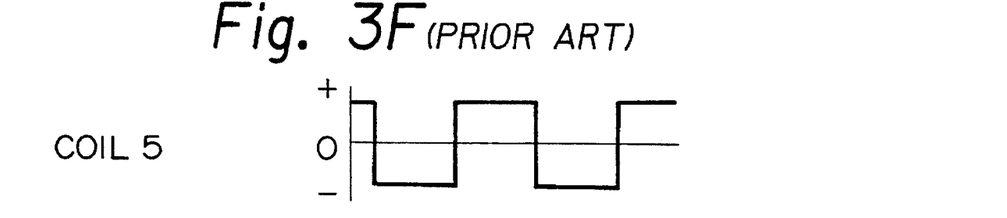
Figure 4A:
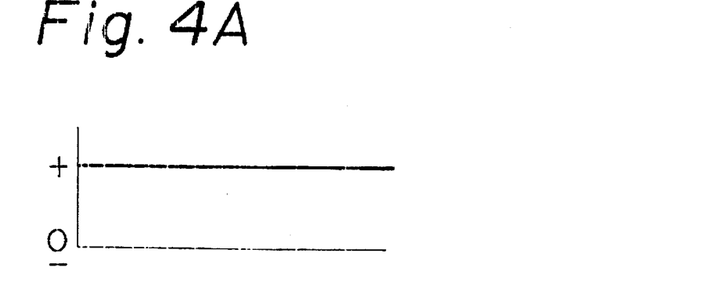
FIG. 4 illustrates waveforms of the output of the position detector and of coil currents when the DC motor apparatus shown in FIG. 2 is started.
Figure 4B:
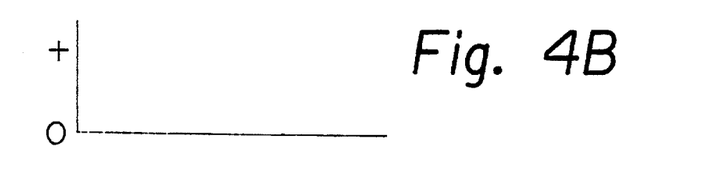
Figure 4C:
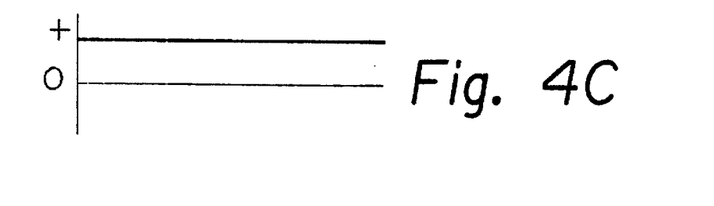
Figure 4D:
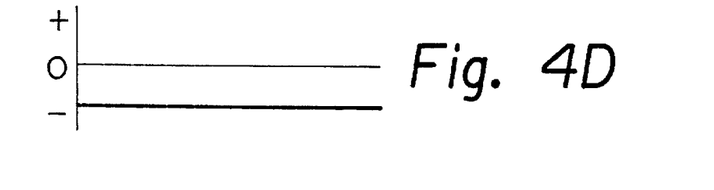
Figure 4E:
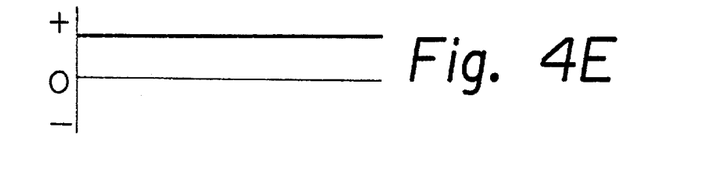
Figure 4F:
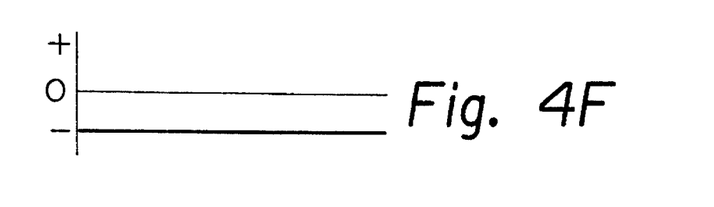

FIG. 2 illustrates an example of an ordinary structure of a conventional DC motor apparatus. An output signal of position detector 7 for detecting a position of the permanent magnet of the rotor is supplied to distributor 8. Distributor 8 switches a current path to selectively supply a current from a DC power supply to any one of coils 2 to 5. When permanent magnet 1 begins to revolve, the current paths which supply currents to coils 2 to 5 are sequentially switched and the rotor of the motor comprising permanent magnet 1 rotates.

FIG. 3 illustrates waveforms of the output of position detector 7 in the DC apparatus shown in FIG. 2 and waveforms of currents flowing through coils 2 to 5. In the structure shown in FIG. 2, in the case where permanent magnet 1 of the rotor is rotating, outputs a and b of position detector 7 alternately go to a positive level periodically due to change in position of the magnetic poles of permanent magnet 1. When output a at a positive level and output b at a zero level are input to distributor 8, positive currents flow through coils 2 and 4 and negative currents flow through coils 3 and 5. Next, when the position of the magnetic poles change and outputs a and b supply signals at positive and zero levels, respectively, to distributor 8, negative currents flow through coils 2 and 4 and positive currents flow through coils 3 and 5. Thus, the switching of coils currents is repeated due to the switching of signals output from position detector 7.

In the conventional DC motor structured as illustrated in FIG. 1 and FIG. 2, an intensive magnetic attracting force is generated between iron core 6 and permanent magnet 1, and thus the rotor of the motor is restricted to stay in a constant direction. Therefore, a large current is required to start such a DC motor and DC power supply source 9 and distributor 8 are both required to have large current capacities. FIG. 4 illustrates waveforms of the output of position detector 7 and waveforms of currents flowing through coils 2 to 5 for start. In the structure shown in FIG. 2, when permanent magnet 1 of the rotor stops, if outputs a and b of position detector 7 are at positive and zero levels, respectively, distributor 8 receiving outputs a and b causes positive continuous currents to flow through coils 2 and 4 and negative continuous currents to flow through coils 3 and 5.

SUMMARY OF THE INVENTION

The present invention has been proposed considering the problems explained above. It is an object of the present invention to provide a DC motor apparatus which can solve the problems described above, namely, that can be started by means of a power supply source having a small current capacity and which provides a large driving force.

In order to achieve the object described above, a DC motor apparatus of the present invention comprises a rotor having a permanent magnet, a plurality of coils, a distributor for controlling switching of current paths to the coils and a position detector for detecting a rotational position of the rotor of the motor to output a switching signal to the distributor. The DC motor apparatus further comprises a pulsating means (pulse forming means) for pulsating a current flowing through any one of the coils. This pulsating means pulsates the current supplied to the coils by the distributor at the time of starting the DC motor.

As described above, a pulsating means is provided and the currents supplied to the coils by the distributor are pulsated by the pulsating means at the time of starting the DC motor. Consequently, magnetic attracting force repeatedly increases or decreases in any rotational direction forcing the rotor to swing back and forth around the restricted position. As a result, a rotating force is increased and the DC motor can be started with only a low level current.

DETAILED DESCRIPTION OF THE PREFERRED EMBODIMENTS

Figure 5:
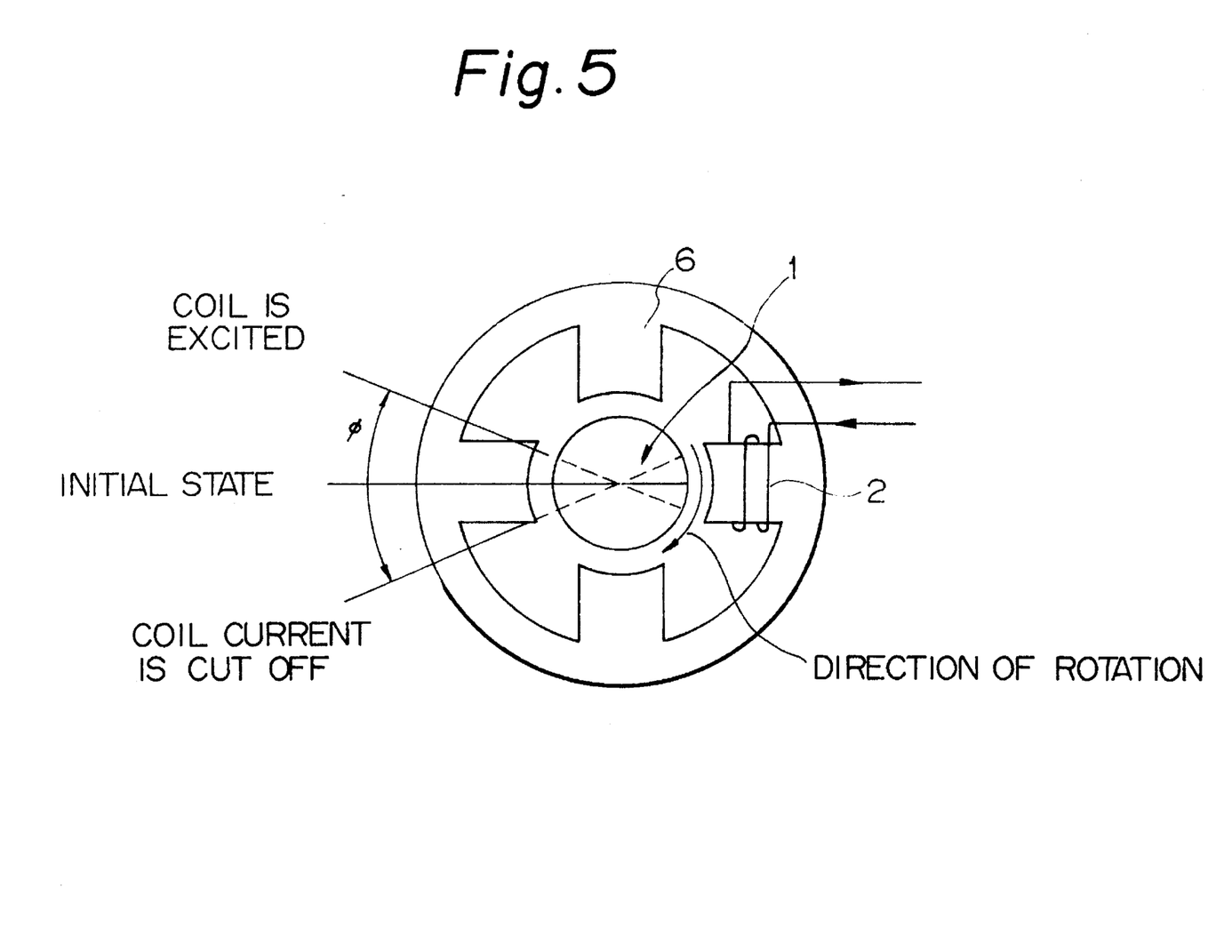
FIG. 5 is a diagram for explaining an operational principle of a DC motor according to the present invention.

Embodiments of the present invention will be described with reference to the accompanying drawings. Elements the same as those shown in FIG. 1 and FIG. 2 are denoted by like reference numbers. The principle of the present invention will be described first. FIG. 5 illustrates an operating principle of a DC motor according to the present invention. In FIG. 5, when a current flows through coil 2 while permanent magnet 1 of the rotor is restricted, a magnetic attracting force is generated and permanent magnet 1 stays at a position where the above magnetic attracting force is balanced by a magnetic attracting force generated by the restricting magnetic field. Thereafter, when the current flowing through coil 2 is cut off, permanent magnet 1 begins to return to the original restricted position taken before the current was supplied, but a repeated swing is generated due to inertial force of the rotor. While inertial force is produced in the rotational direction, a current is supplied again to coil 2, and the rotor swings more widely than previously.

A rotating force T has a relationship with the inertial force expressed by the following equation to express motion:

$$T = J(d^2\theta/dt^2) + D(d\theta/dt)k\theta$$

Where,
J: inertial force;
D: control factor;
k: spring constant;
θ: rotating angle.

When a current is initially supplied to the coil, no inertial force is generated because of the stationary condition. However, when a current is supplied again after the current has been cut off, rotating force T increases when force J is of a positive value resulting in an increase in rotating angle θ. Therefore, the rotating force can be caused to increase by controlling a coil current flow when the inertial force is applied in the rotating direction, and thus the DC motor can be started with only a small current. An example of the structure of a DC motor according to the present invention utilizing such an operational principle as described above will be explained hereunder.

Figure 6:
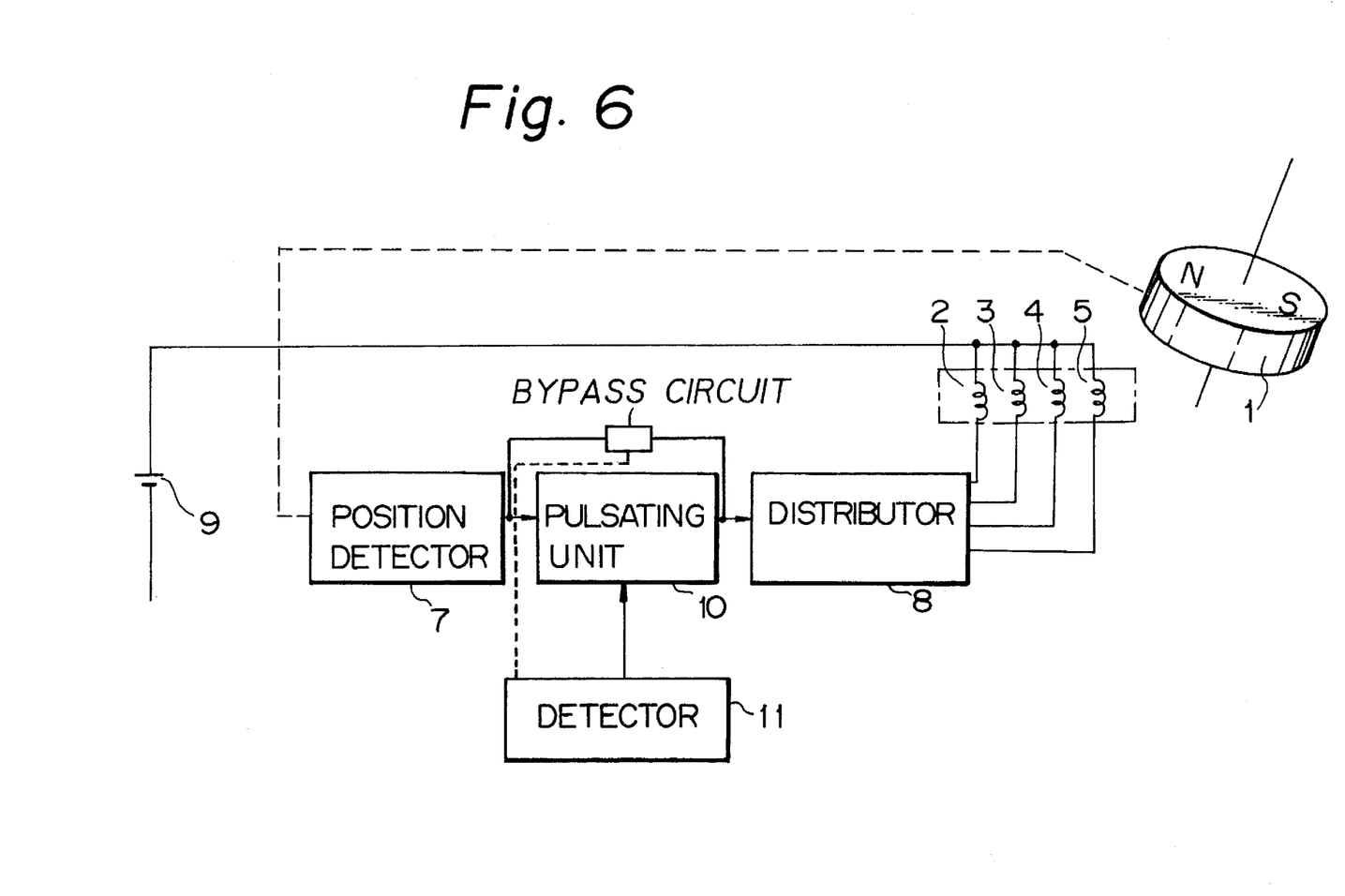
FIG. 6 illustrates an example of the structure of a DC motor apparatus according to the present invention.
Figure 7:
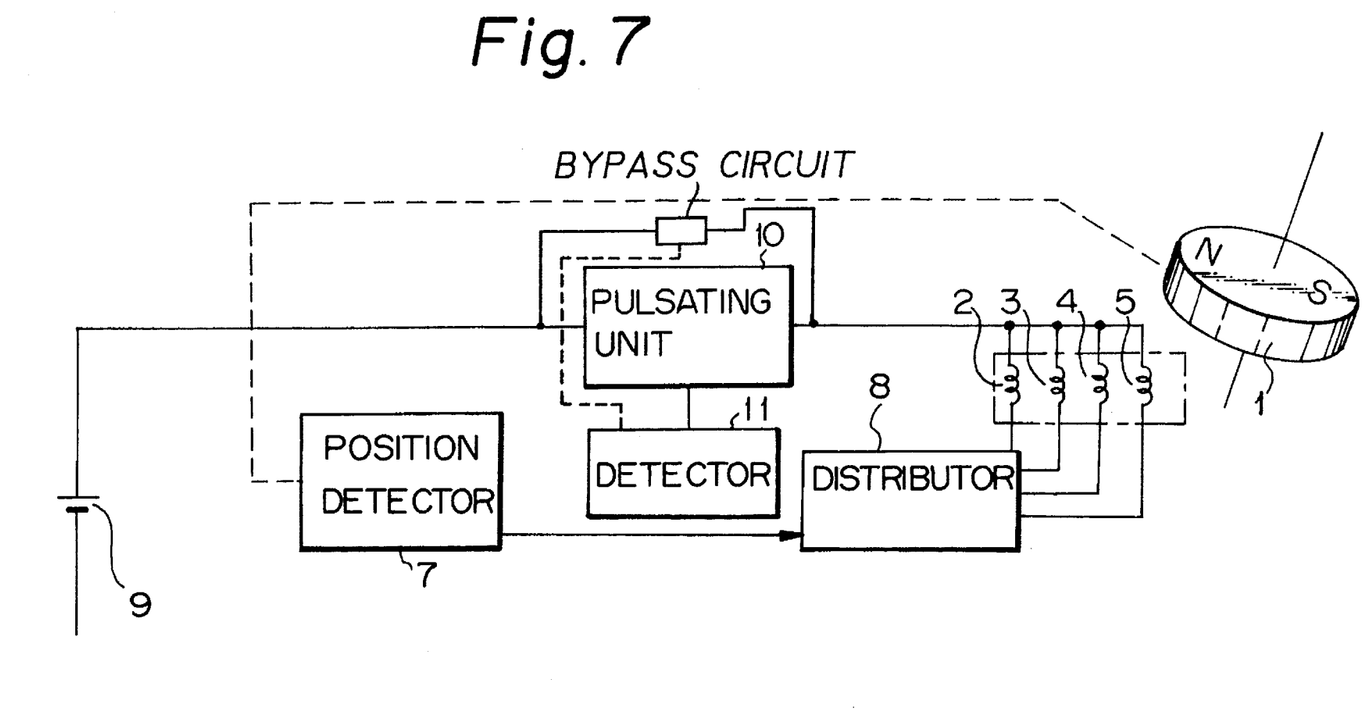
FIG. 7 illustrates another example of the structure of a DC motor apparatus according to the present invention.
Figure 8A:
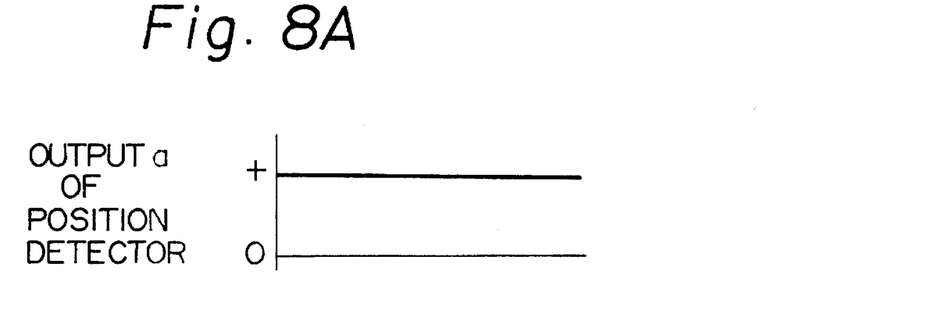
FIG. 8 illustrates waveforms of the output of a position detector and of coil currents when a DC motor apparatus of the present invention is started.
Figure 8B:
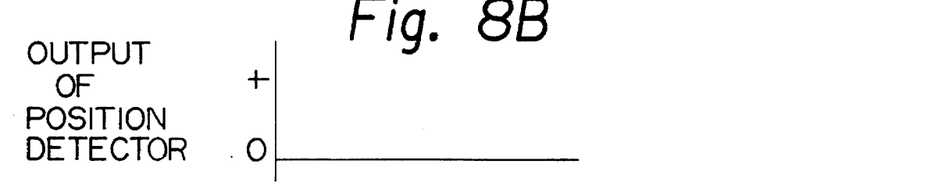
Figure 8C:
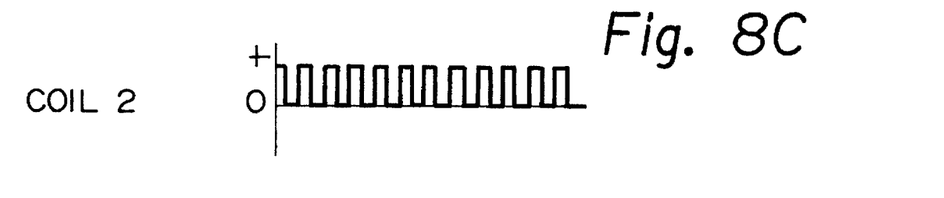
Figure 8D:
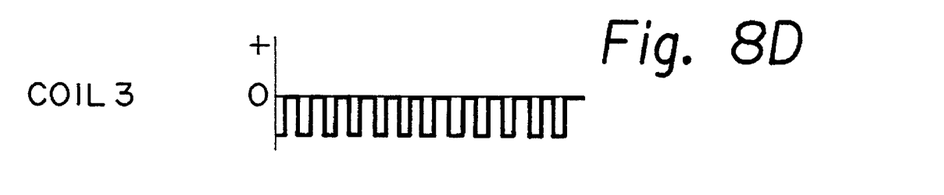
Figure 8E:
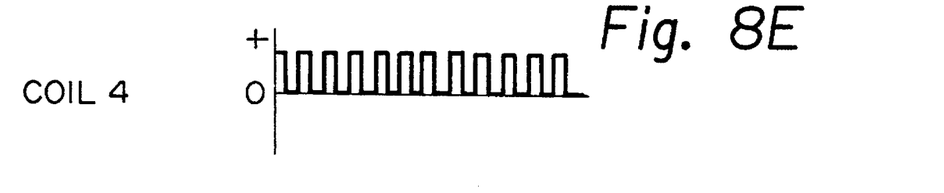
Figure 8F:
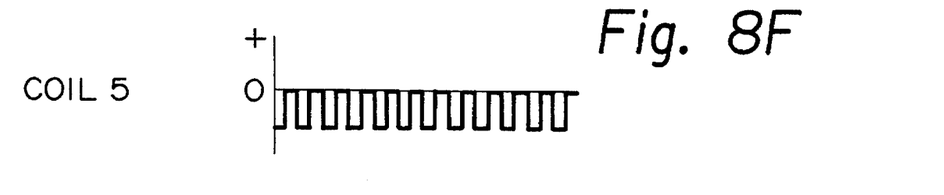

FIG. 6 and FIG. 7 respectively illustrate structures of different embodiments of a DC motor apparatus according to the present invention. In FIG. 6, a pulsating means 10 for pulsating currents flowing through coils 2 to 5 is disposed between position detector 7 and distributor 8. The reference numeral 11 designates a start detector that detects the completion of starting of the DC motor and outputs a signal for stopping or bypassing the operation of pulsating means 10. In FIG. 7, a current supplied from DC power supply 9 is supplied to coils 2 to 5 through pulsating means 10.

In the DC motor apparatus having the structure as shown in FIG. 6 and FIG. 7, position detector 7 detects the position of permanent magnet 1 and distributor 8 outputs a current to a desired one of coils 2 to 5. This current is controlled by pulsating means 10 and caused to flow intermittently. As a result, the inertial force works on the rotor incorporating permanent magnet 1 resulting in the excitation of the DC motor with a small current, as described above. When detector 11 detects the completion of starting of the motor, detector 11 stops or bypasses operation of pulsating means 10.

FIG. 8 illustrates waveforms of the output of position detector 7 and of currents flowing through coils 2 to 5 when the DC motor apparatus having the structure as shown in FIG. 6 and FIG. 7 is started. In the structure shown in FIG. 6, when permanent magnet 1 of the rotor stops, if outputs a and b of position detector 7 are at positive and zero levels, respectively, distributor 8 controlled by pulsating means 10 causes positive continuous currents to flow through coils 2 and 4 and negative continuous currents to flow through coils 3 and 5 at the same timing. As illustrated in the figures, the currents flowing through coils 2 to 5 are pulsated by pulsating means 10 at the time of starting the DC motor. After the motor has been started, currents similar to those in the prior art shown in FIG. 3 flow through coils 2 to 5.

There is no substantial difference in effect of pulsating currents flowing through coils 2 to 5 in the example (refer to FIG. 6) where pulsating means 10 is disposed between position detector 7 and distributor 8 and in the example (refer to FIG. 7) where pulsating means 10 is disposed between DC power supply 9 and coils 2 to 5.

Figure 9:
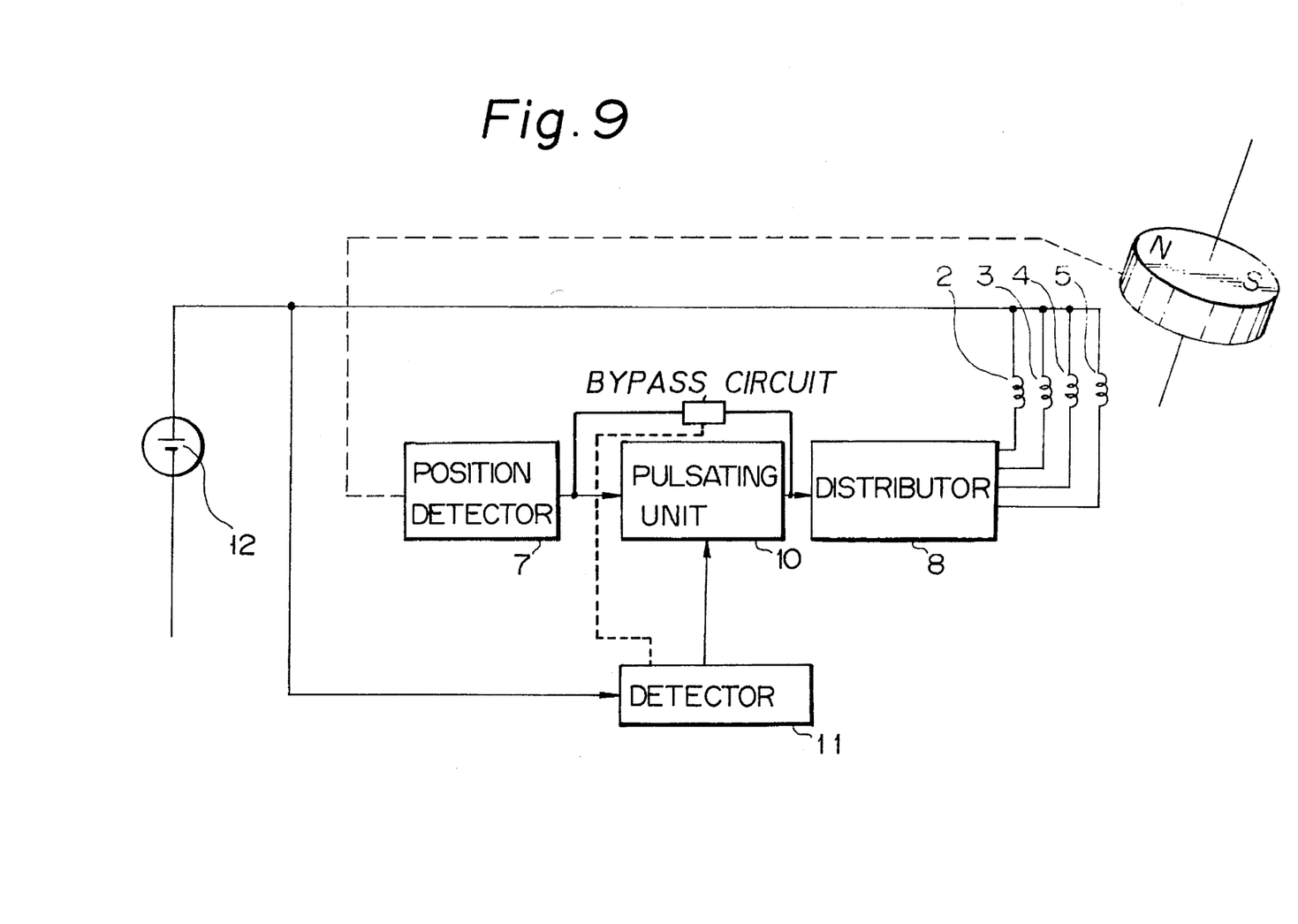
FIG. 9 illustrates still another example of the structure of a DC motor apparatus according to the present invention.

FIG. 9 illustrates another embodiment where a DC motor apparatus according to the present invention is driven by a solar cell array 12 as a power supply. As indicated in the figure, start detector 11 is connected to an output terminal of solar cell array 12 so that a voltage appearing at this terminal drives pulsating means 10. After only limited exposure to sunlight, solar cell array 12 accumulates a small current capacity. Therefore, a conventional DC motor apparatus as shown in FIG. 2 may not be able to be started. In order to avoid such a problem, start detector 11 is connected to an output terminal of solar cell array 12. When the voltage at the output terminal is lower than a predetermined value, pulsating means 10 is activated to pulsate the currents fed from distributor 8 to the coils. As a result, the DC motor can be started with a small current. When an amount of sunlight increases, the output voltage of solar cell array 12 increases and pulsating means 10, automatically stops operation, resulting in a return to the stationary state. Particularly, when it is requested to start a pump with a solar cell array, a DC motor for driving a pump may frequently start and stop depending on an amount of sunlight. Such a problem can effectively be solved by using a DC motor apparatus according to the present invention.

As described above, the present invention can reduce a starting current by utilizing a structural characteristic of a DC motor enabling the provision of a DC motor apparatus with a simplified structure at low cost. The present invention is particularly suited for a DC motor apparatus in which a DC motor requiring a large starting current in comparison with a current in the stationary state is driven with a power supply having a small current capacity.

While the present invention has been described in detail with reference to specific embodiments thereof, it will be understood by those skilled in the art that various changes and modifications may be made without departing from the spirit and scope of the invention claimed.

What is claimed is:

1. A DC motor comprising:
   a rotary member for rotating about an axis;
   a stationary member having a pluarlity of coils;
   a position setecting means for detecting a pluarlity of positions of said rotary member as said rotary member rotates about said axis;
   a DC current distributing means responsive to the output of said position detecting means for sequentially swithcing DC current supplied to said plurality of coils;
   a pulsating means for pulsating the DC current flowing through at least one of said plurality of coils selected on the basis of a position of said rotary member detected by said position detector during a period that said DC current is being supplied to said at least one coil; and
   wherein, during start-up of the motor, the DC current is pulsed in a timed sequence such that a driving force due to the DC current coincides with a back-and-forth swing of the rotary member resulting from the inertial force of the rotary member when the DC current pulses are supplied thereto.

2. A DC motor apparatus according to claim 1, wherein said pulsating means is disposed between said position detecting means and said distributing means.

3. A DC motor apparatus according to claim 2, further comprising an excitation;detector for detecting the completion of starting of said motor to stop or bypass the operation of said pulsating means.

4. A DC motor apparatus according to claim 1, wherein said pulsating means is disposed between said plurality of coils and a power supply which supplies currents to these coils.

5. A DC motor apparatus according to claim 4, further comprising an excitation detector for detecting the completion of starting of said motor to stop or bypass the operation of said pulsating means.

6. A DC motor comprising:

a magnetic rotor being rotatable about an axis;

a stator adjacent said rotor and having a plurality of coils;

a position detecting means for detecting a magnetic position of the rotor with respect to the stator;

a DC current distributor connectable to the coils for supplying current and creating magnetic fields around the coils for causing the rotor to rotate;

a pulsating unit for pulsating the current supplied by the distributor;

a detector for detecting when the DC motor is in an initial start-up state and when the DC motor reaches a steady-state;

wherein, during the initial start-up state of the DC motor, current is supplied to a single coil selected on the basis of the magnetic position of the rotor, the pulsating unit pulsates the current supplied to said single coil at a rate which causes the rotor to pendulate back and forth with increasing momentum; and wherein, during the steady-state of the DC motor, the pulsating unit no longer pulsates the current and the DC distributor supplies current to each of the coils in sequential order to cause the rotor to continuously rotate.

* * * * *